(12) United States Patent
Anderson

(10) Patent No.: US 7,621,690 B2
(45) Date of Patent: Nov. 24, 2009

(54) CONNECTING DEVICE

(76) Inventor: John Anderson, Beech Grove, Goodrich, Herefordshire (GB) HR9 6JE ( * ) Notice: Subject to any disclaimer, the term of this patent is extended or adjusted under 35 U.S.C. 154(b) by 0 days.

(21) Appl. No.: 11/406,684

(22) Filed: Apr. 19, 2006

(65) Prior Publication Data

US 2006/0239767 A1 Oct. 26, 2006

Related U.S. Application Data

(60) Provisional application No. 60/674,201, filed on Apr. 22, 2005.

(51) Int. Cl.
*B25G 3/18* (2006.01)
(52) U.S. Cl. .................................. 403/329; 403/109.3
(58) Field of Classification Search ............. 403/109.3, 403/109.8, 202, 204, 289, 291, 314, 326, 403/329, 361, 374.1, 376, 380, 80, DIG. 14; 24/293–295, 613, 615
See application file for complete search history.

(56) References Cited

U.S. PATENT DOCUMENTS

| | | | | |
|---|---|---|---|---|
| 3,131,899 A | * | 5/1964 | Luhrs | 248/188 |
| 3,512,222 A | * | 5/1970 | Tinnerman | 24/561 |
| 3,672,708 A | * | 6/1972 | Zemberry | 285/315 |
| 3,832,075 A | | 8/1974 | Arai | |
| 4,688,337 A | * | 8/1987 | Dillner et al. | 24/616 |
| 4,688,377 A | * | 8/1987 | Winkel et al. | 56/228 |
| 5,102,253 A | * | 4/1992 | Pugliesi-Conti et al. | 403/5 |
| 5,165,213 A | * | 11/1992 | Finch et al. | 52/588.1 |
| 5,342,139 A | * | 8/1994 | Hoffman | 403/327 |
| 5,927,028 A | * | 7/1999 | Rossi | 52/202 |
| 6,012,868 A | * | 1/2000 | Aoki | 403/326 |
| 6,292,979 B1 | * | 9/2001 | Kuo | 16/113.1 |
| 6,467,747 B1 | * | 10/2002 | Ellsworth | 248/548 |
| 6,824,180 B2 | * | 11/2004 | Tomchak | 294/57 |
| 6,830,280 B2 | * | 12/2004 | Sturt et al. | 296/97.9 |
| 2005/0091808 A1 | * | 5/2005 | Uehara et al. | 24/615 |
| 2007/0154257 A1 | * | 7/2007 | Guttormsen | 403/329 |

FOREIGN PATENT DOCUMENTS

| | | |
|---|---|---|
| GB | 1 038 642 | 8/1966 |
| GB | 1 176 015 | 4/1967 |
| GB | 1 464 760 | 2/1977 |
| GB | 1 556 730 | 11/1979 |

\* cited by examiner

*Primary Examiner*—Michael P Ferguson
*Assistant Examiner*—Joshua T Kennedy
(74) *Attorney, Agent, or Firm*—King & Schickli, PLLC

(57) ABSTRACT

A connecting device includes an inner component (100) and an outer component (200). The inner component is dimensioned to be at least partially received in the outer component, with a pair of surfaces (102A, 102B) of the inner component facing a pair of corresponding surfaces (202A, 202B) of the outer component. At least some of the surfaces include interengageable formations (106, 108, 206, 208). The device further includes an arrangement (104) for allowing relative movement between at least one of the surfaces of the inner component and the corresponding surface of the outer component to allow for engagement and/or disengagement of the formations.

20 Claims, 4 Drawing Sheets

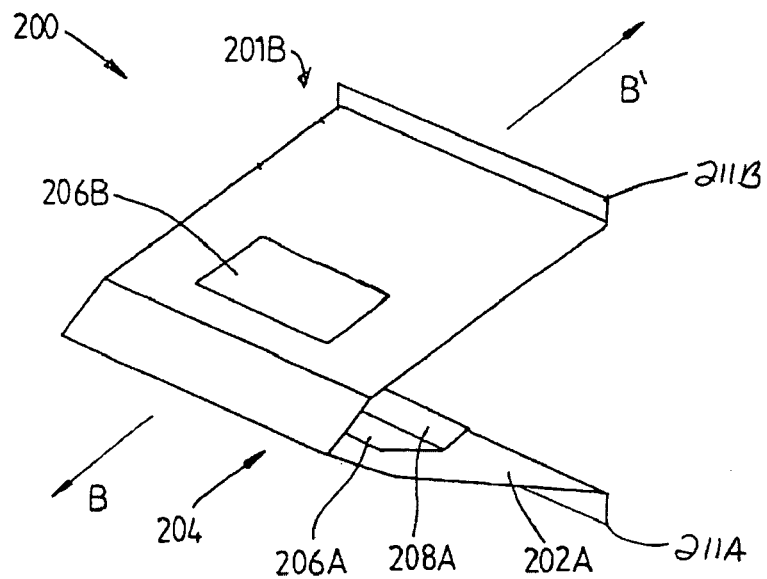
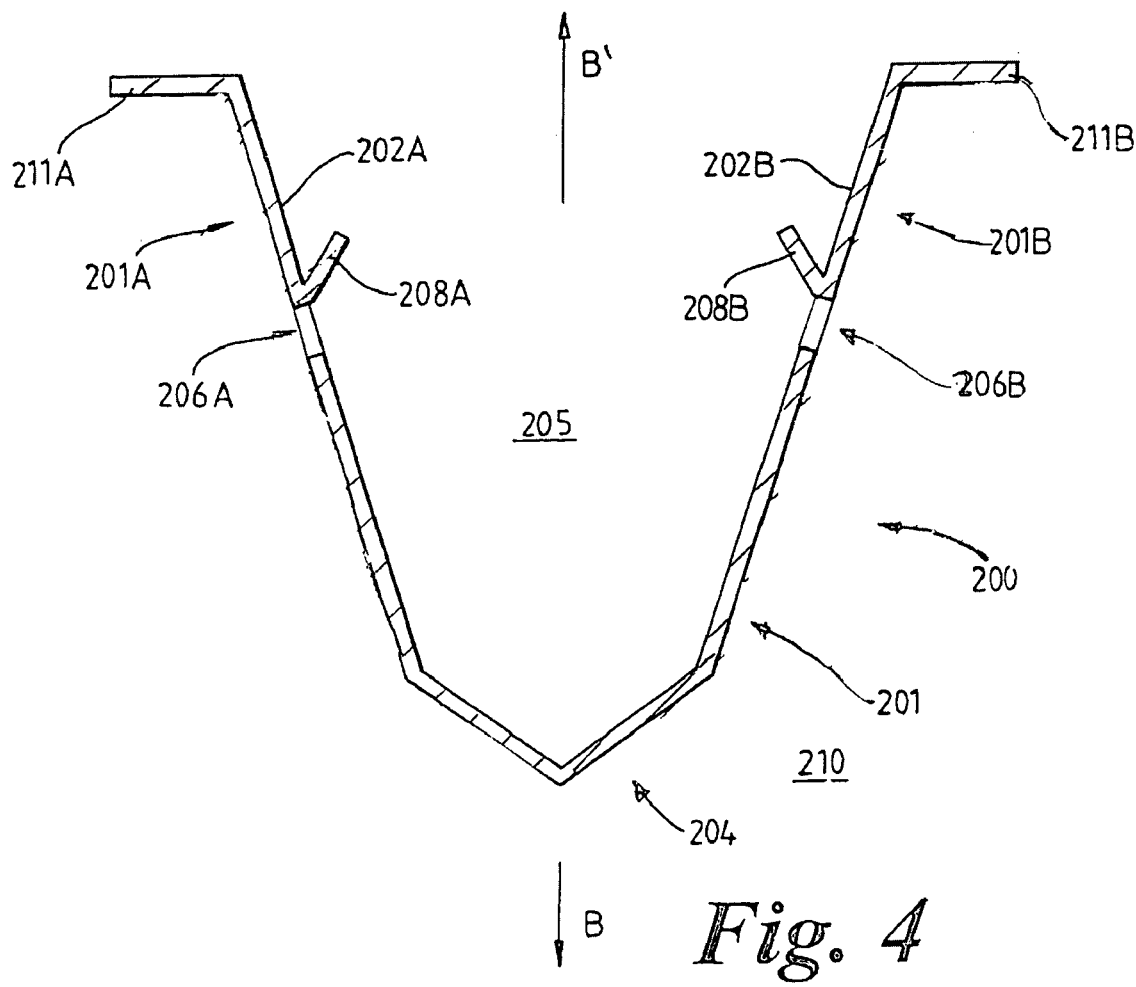

CONNECTING DEVICE

The present application claims the benefit of U.S. provisional patent application Ser. No. 60/674,201 filed on Apr. 22, 2005.

FIELD OF THE INVENTION

The present invention relates to a connecting device.

BACKGROUND TO THE INVENTION

There are several conventional systems and devices for joining various types of components together. It is generally desirable for connectors to be economical to produce and it is also beneficial if they are easy to fit. In many cases, such as in the construction industry, the connection needs to be durable and strong and should require minimal onsite operations and little or no additional mechanical fixings. It is also often desirable for the connector to be releasable.

SUMMARY OF THE INVENTION

According to a first aspect of the present invention there is provided a connecting device including:

an inner component and an outer component, the inner component being dimensioned to be, in use, at least partially received in the outer component, with a pair of surfaces of the inner component facing a pair of corresponding surfaces of the outer component, wherein at least some of the surfaces include interengageable formations, and an arrangement for allowing relative movement between at least one of the surfaces of the inner component and the corresponding surface of the outer component to allow for engagement and/or disengagement of the formations.

In use, the inner component may be attached to a first object to be connected and the outer component may be attached to another object.

The (inner) surfaces of the outer component may define an open internal space, into which at least part of the inner component may be received.

The arrangement for allowing relative movement of the components may, in use, urge at least one of the surfaces of the inner component towards the corresponding surface of the outer component, which may facilitate engagement of the formations. Thus, at least one of the surfaces of the inner component may at least partially contact the corresponding surface(s) of the outer component in use.

The formations of the inner component may include projections and the formations of the outer component may include apertures, in use, the projections extending at least partially into the apertures to fix the components together. Alternatively or additionally, the formations of the outer component may include projections and the formations of the inner component may include apertures, in use, the projections extending at least partially into the apertures to fix the inner and outer components together. The projections may extend outwardly from the surfaces of the inner component in a direction transverse to the general direction in which the inner component is inserted into the outer component. The projections may extend inwardly from the surfaces of the outer component in a direction transverse to the general direction in which the inner component is inserted into the outer component.

In one embodiment, an end portion of at least one of the projections on the inner or outer component is formed such that, in use, the end portion at least partially encircles an end of a corresponding projection on the other (outer or inner) component.

The (outer) surfaces of the inner component may generally oppose each other and may be substantially symmetrical about a notional central line running from one end of the inner component to its other end. The (inner) surfaces of the outer component may generally oppose each other and may be substantially symmetrical about a notional central line running from one end of the outer component to its other end. The shapes of the outer surfaces of the inner component may at least partially correspond to the shapes of the inner surfaces of the outer component. The shapes of the two components may be substantially similar, with at least some of the projections of the inner component extending in a generally opposite direction to at least some of the projections of the outer component. The surfaces of the inner component and the surfaces of the outer component may be convergent and can form a generally truncated V-shape.

The arrangement for allowing relative movement may include a spring-like flexible joint or hinge formed between the surfaces of the inner component, in use, the joint/hinge may bias the surfaces of the inner component towards the surfaces of the outer component. The joint/hinge may have a generally (inverted) V shape. Alternatively or additionally, the arrangement for allowing relative movement may include a component for biasing the surfaces of the outer component towards the surfaces of the inner component. Alternatively, the arrangement for allowing relative movement may include a spring; a device formed of elastic material; a pneumatic device or an electromechanical device.

At least part of at least one of the inner or outer components may be formed of a resiliently flexible material so that when a force is applied to the component, the arrangement for allowing relative movement can be used to release the formations of the inner and outer components from each other.

According to another aspect of the present invention there is provided an inner component of a connecting device substantially as described herein. According to yet another aspect of the present invention there is provided an outer component of a connecting device substantially as described herein.

According to a further aspect of the present invention there is provided a method of connecting two objects together, the method including steps of:

attaching one of the objects to an inner component of a connecting device substantially as described herein;

attaching the other object to an outer component of the connecting device substantially as described herein, and fitting the inner component at least partially into the outer component such that the formations on the corresponding surfaces of the inner and outer components interengage to connect the components (and thereby the objects) together.

According to a further aspect of the present invention there is provided a structure (which may part of a building) including at least two objects connected together by means of a connecting device substantially as described herein.

Whilst the invention has been described above, it extends to any inventive combination of the features set out above or in the following description.

BRIEF DESCRIPTION OF THE DRAWINGS

The invention may be performed in various ways, and, by way of example only, embodiments thereof will now be described, reference being made to the accompanying drawings, in which:

FIG. 3 illustrates schematically a perspective view of an outer component of the connecting device;

FIG. 4 is a sectional view through line B-B' of FIG. 3;

DETAILED DESCRIPTION OF THE DRAWINGS

Figure 1:
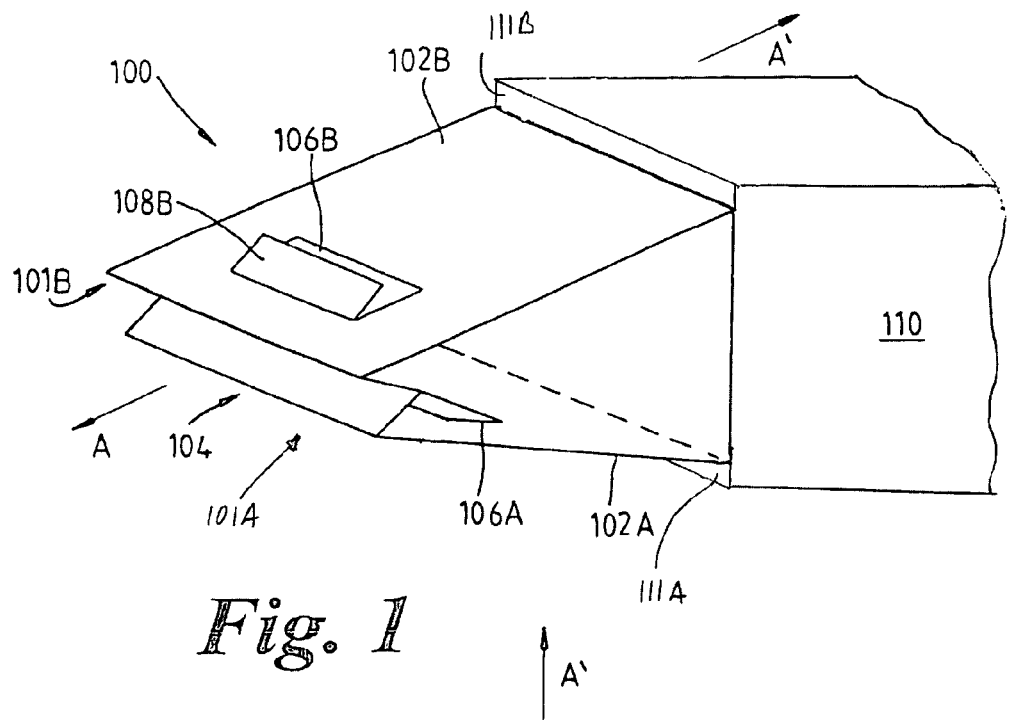
FIG. 1 illustrates schematically a perspective view of an inner component of an embodiment of the connecting device.
Figure 2:
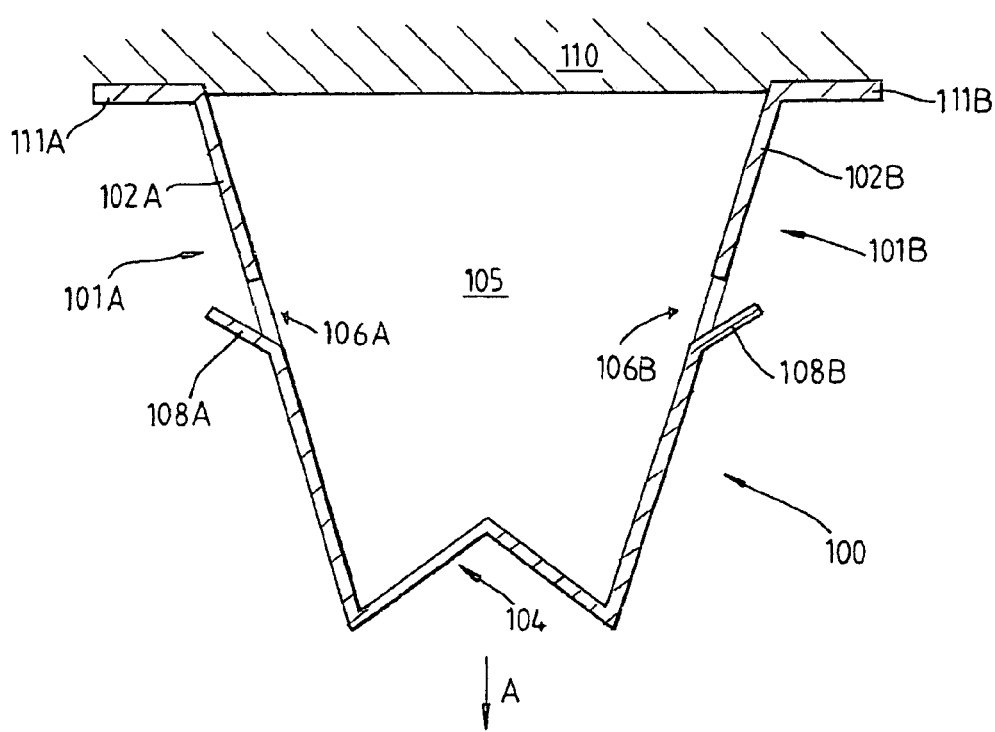
FIG. 2 is a sectional view through line A-A' of FIG. 1.

Referring to FIGS. 1 and 2, an inner component 100 of the connecting device is shown. The component 100 in the example is formed of a single sheet of material, but it will be understood that it could be formed of separate components. The sheet may be formed of a material (or a laminate formed of one of more materials) that is elastic, ductile, malleable, hard, strong in tension, compression and shear, with a strong yield strength. The material(s) may be selected from alloys, metals (e.g. steel, aluminium, copper or Titanium) and/or non-metal(s) (e.g. plastics, including thermosetting glass (or carbon fibre)-reinforced plastics). The thickness and other dimensions of components of the connecting device will be selected in accordance with the particular application for which the device is intended, e.g. the magnitude of the load to be transferred. The thickness of the component 100 may be uniform or non-uniform. The sheet is formed so that the component 100 includes a first portion 101A and a second portion 101B that are connected together by means of a connecting portion generally shown at 104.

Each of the portions 101A, 101B is substantially flat (although it could be formed to have another shape) and in the example, the connection portion 104 is formed of a bent portion of the sheet located between the lower ends of the portions 101A, 101B. The connecting portion 104 has a generally "inverted V" shape (but could include further bends to form a "W" like shape) and the flexible nature of the sheet of material used for the inner component 100 means that the connecting portion 104 (which can be thought of as a hinge) can be compressed to move the two portions 101A, 101B at least partially towards each other upon application of a suitable force.

In FIG. 2, the portion 101A extends upwards from the left hand (lower) tip of the inverted V shape connection portion 104 to the left at an angle. In general, the magnitudes of angles of portions of the connecting device will be dependent on the elasticity of the material(s) used and the required deformation. The angle at which portion 101A extends with respect to the normal, may be subject to design, as small as possible, e.g. between around 5° and 45° to the normal. A portion 101B extends upwards from the right hand tip of the connecting portion 104 to the right at an angle of around 5° to 45° to the normal. Thus, the general outline of the first 101A and second 101B portions when viewed from the side (as in FIG. 2) is two converging lines forming a generally truncated V shape (that is substantially symmetrical about a notional central line) that defines an open internal space generally indicated at 105. The surface of portion 101A remote from the internal space 105 is labelled 102A and the surface of portion 101B remote from the internal space 105 is labelled 102B.

An aperture 106A is present in portion 101A. In the example shown in the Figures, the aperture 106A is a substantially rectangular slot, but it will be understood that an aperture of another shape could be used. In the example, the aperture 106A is formed by stamping out three lines that define three sides of a notional rectangle on the portion 101A and bending the resulting cut portion 108A along a line defining the fourth side of the rectangle so that the portion 108A projects outwardly (away from the internal space 105) from the surface 102A. The thickness of the free end of the portion 108A may be reduced so that the portion tapers. Also, the portion 108A may be shortened in order to facilitate engagement with an aperture as will be described below (but will be of sufficient length to transfer load between the components 100 and 200). Thus, the portion 108A forms a projection that extends outwardly at an angle to the main direction of the surface 102A and upwards (away from the connecting portion 104). The angle may be, subject to design, as small as possible, e.g. between around 5° and 45°. It will be understood that at least some of the projections of the connecting device could be formed in a different manner, e.g. they could be separate pieces that are fixed onto surfaces of the components of the device.

A corresponding aperture 106B and projection 108B are formed on the portion 101B, with the projection 108B extending outwardly at an angle of, for example, between around 5° and 45° to the main direction of the surface 102B, upwards/away from the connecting portion 104. Although only one aperture/projection is shown on each of the portions 101A, 101B in the Figures, it will be appreciated that a plurality of apertures and respective projections could be arranged on the portions 101A, 101B. The apertures/projections may be arranged in the same pattern on both portions 101A, 101B, or the arrangement could be different. In yet another embodiment, the type of fixing formations used on either or both of the portions 101A, 101B can be other than an aperture/projection, e.g. releasable interlocking devices or other arrangements of grooves/apertures and projections.

The inner component 100 is shown as being attached to an object 110 that is to be connected to another object using the connecting device. The object 110 is attached to the portions 101A, 101B at the upper end of the internal space 105 in the example. A flange 111A may extend outwardly from the upper end of portion 101A at the joint with the object 110. Similarly, a flange 111B may extend outwardly from the upper end of portion 101B at the joint. The object 110 can be any type of object that is to be connected to another object. For example, the object 110 could be a building construction member (that can have a decorative and/or structural function) such as a panel, base, beam or column that is to be joined to another object at the intersection of their surfaces. The object 110 can be connected to the component 100 in any suitable way, e.g. by means of adhesives, fasteners, etc. In an alternative embodiment, the objects to be connected could be integrally formed with components of the connecting device.

Turning to FIGS. 3 and 4, an example of the outer component of 200 of the connecting device is shown. The component 200 in the example is formed of a single sheet/laminate of material, but, again, it will be understood that it could be formed of separate members. Also, the material(s) used for the component 200 may be the same as, or different to that/those used for component 100, but will have properties similar to those mentioned above. The thickness of the component 200 may be uniform or non-uniform and so it may or may not have the same thickness as corresponding portions of the inner component 100. The inner surfaces of the outer component 200, in general, at least partially correspond to the shape and size of the outer surfaces of the inner component 100. The sheet is formed so that the component 200 includes a first portion 201A and a second portion 201B that are connected together by means of a connecting portion generally shown at 204.

Each of the portions 201A, 201B is substantially flat and in the example, the connecting portion 204 is formed of a bent portion of the sheet located between the (lower) ends of the portions 201A, 201B. The connecting portion 204 is generally "V" shaped (but could include further bends to form a "W" like shape) and in FIG. 4 the portion 201A extends upwards from the left hand (upper) tip of the V shaped connecting portion 204 to the left at an angle of around 25° to the normal. It will be understood that this angle is exemplary only for when the component 208 is not engaged with another component. In general, the angle at the intersection will allow for components 108 and 208 to pass over each other for engagement. While at full engagement, the angle will substantially match the corresponding angle of portion 104 of the component 101. The portion 201B extends upwards from the right hand tip of the connecting portion 204 to the right at an angle of around 25° to the normal.

The general outline of the first 201A and second 201B portions when viewed from the side (as in FIG. 4) is two converging lines forming a generally truncated V shape (that is substantially symmetrical about a notional central line) that defines an open internal space generally indicated at 205. The surface of portion 201A adjacent the internal space 205 is labelled 202A and the surface of portion 201B adjacent the internal space 205 is labelled 202B. The distance between the upper ends of the two portions 201A, 201B, when no external force is being applied to the outer component 200 is greater than the distance between the corresponding parts of portions 101A, 101B of the inner component 100.

An aperture 206A is present in portion 201A. The aperture 206A is a substantially rectangular slot similar to the apertures 106 of the inner component 100. There is also a projection 208A at the aperture 206A that is similar to the projections 106 of the inner component 100, except that the projection 208A extends inwardly from the surface 202A towards the internal space 205 at an angle of, for example, between 5° and 45° from the main direction of the surface 202B, generally upwards away from the connection portion 204. A corresponding aperture 206B and projection 208B are formed on the portion 201B, with the projection 208B extending inwardly at an angle of, for example, between around 5° and 45° from the main direction of the surface 202B and upwards and away from the connecting portion 204. Again, it will be understood that a plurality of apertures and respective projections could be present on the portions 201A, 201B, but they will, in general, be arranged in a manner that corresponds to the pattern of the fixing formations (e.g. projections/apertures) on the portions 101A, 101B, respectively. Further, the type of fixing formations used on either or both of the portions 201A, 201B can be other than the aperture/projection arrangement shown to correspond with those on the corresponding portions 101A, 101B of the inner component 100.

Figure 6:
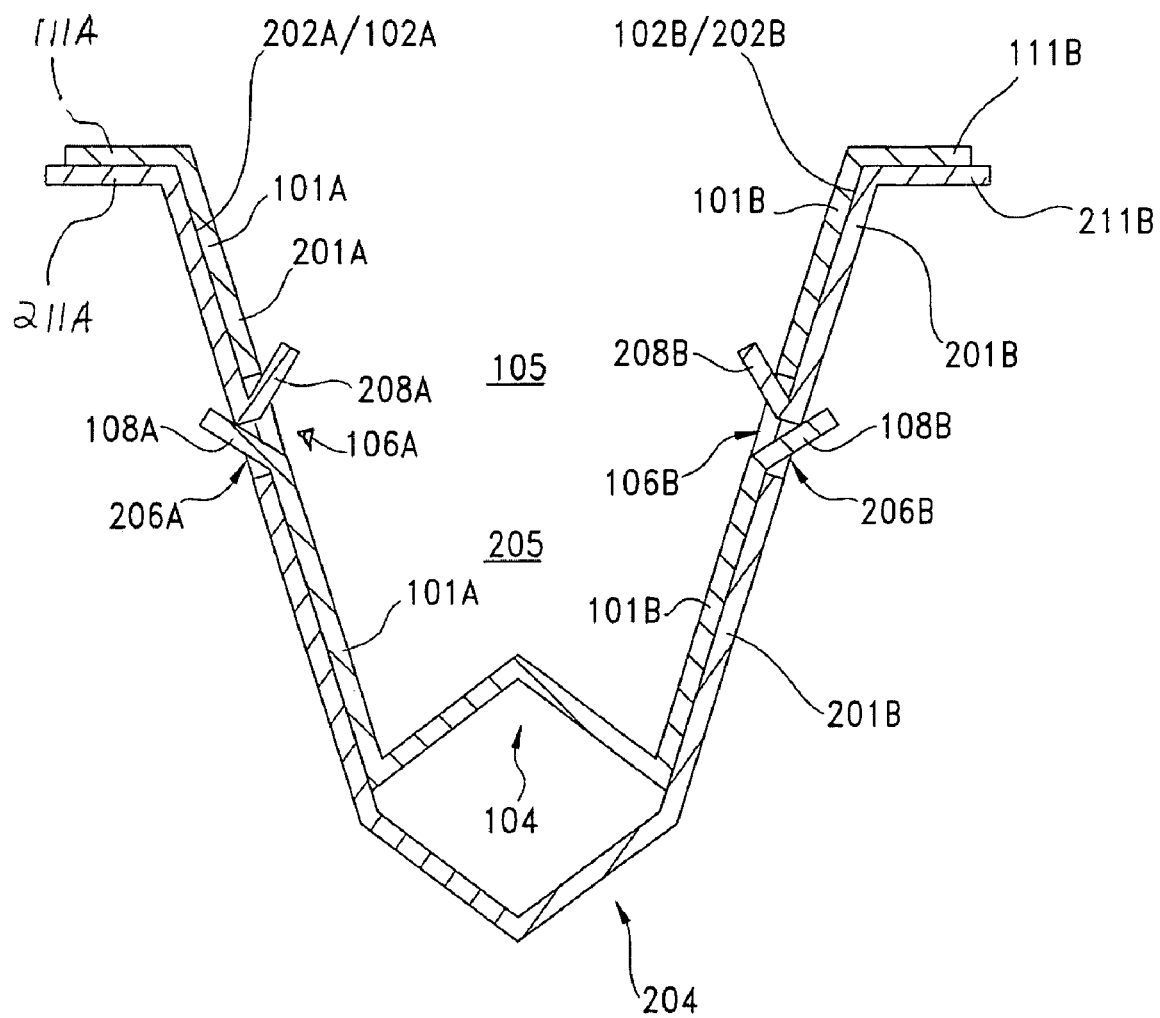
FIG. 6 is a sectional view of the connecting device showing the interconnection of its inner and outer components.

The outer component 200 of the connecting device is shown as being attached to an object 210 (partially indicated by the vertical hatching in FIG. 4 only for clarity) that is to be connected to the object 110 using the connecting device. The object 210 is attached to outer surfaces of the component 200 in the example. A flange 211A may extend outwardly from the upper end of portion 201A at the joint with the object 210. Similarly, a flange 211B may extend outwardly from the upper end of portion 201B at the joint. Again, the object 210 can be any member that is to be connected to another object. The inner and outer components 100, 200 are shown together in FIG. 6.

Figure 5:
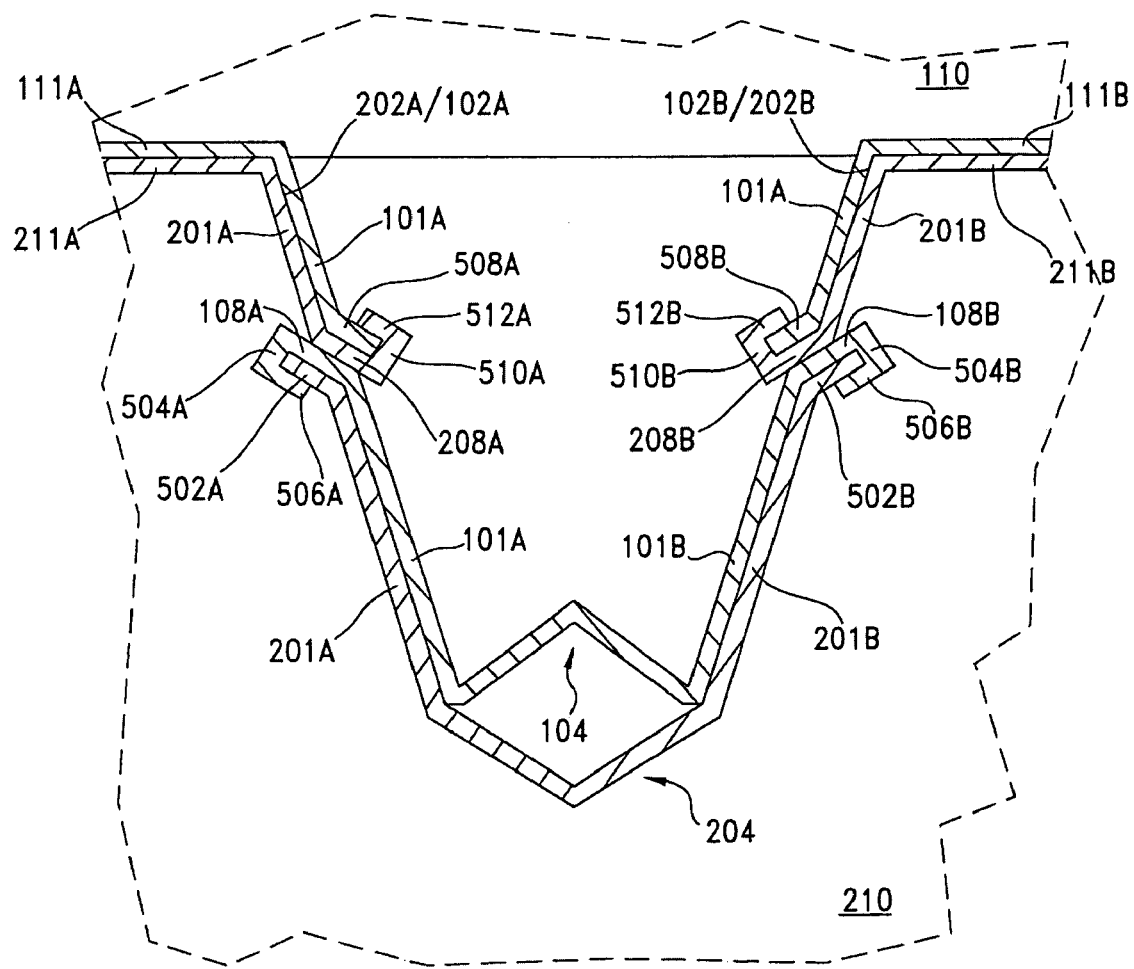
FIG. 5 is a sectional view through another embodiment of the connecting device, showing the interconnection of its inner and outer components.

Turning to FIG. 5, an alternative embodiment of the inner and outer components of the connecting device is shown. Parts of the device corresponding to those of the first example are labeled using identical reference numbers, but the objects 110, 210 to be connected are not shown for ease of illustration.

In the example of FIG. 5, the first portion 201A of the outer component 200 includes a further projection 502A that extends outwardly (away from internal space 205) at an angle of around between 5° and 45° to the main direction of the portion 201A in a generally upwards direction away from the connecting portion 104. The further projection 502A extends from the side of aperture 206A that is opposite the side from which the projection 208A extends towards the internal space 205.

An end portion of the projection 108A of the inner component portion 101A is shaped so that it includes a first further portion 504A that extends transversely (e.g. an angle of around 90° to the main direction of the projection 108A) from the end of the projection 108A, generally downwards towards the bottom end (connecting portion 104) of the component 100. A second further portion 506A then extends substantially perpendicularly from the first further portion 504A in a direction substantially parallel that of the main direction of the end of the projection 108A, back towards the portion 101A. The length of the first further portion 504A generally corresponds to the thickness of the outer component further projection 502A so that these two portions can interlock as described below.

The second portion 201B of the outer component 200 includes a similar further projection 502B that projects outwardly from a corresponding location below aperture 206B. The second portion 101B of the inner component 100 includes similar first 504B and second 506B further portions that extend generally outwardly from the projection 108B.

The first portion 101A of the inner component 100 includes a further projection 508A that extends inwardly (towards internal space 105) at an angle of between around 5° and 45° to the main direction of the portion 101A in generally downwards direction (towards connecting portion 104) that corresponds to the direction of projection 208A in the embodiment of FIG. 5. The further projection 508A is located at the side of aperture 106A that is opposite the side from which the projection 108A extends away from the internal space 105. In the embodiment of FIG. 5, the projections 208A, 208B extend in a generally downwards direction instead of upwards.

An end portion of the projection 208A of the outer component 200 is shaped so that it includes a first further portion 510A extending transversely (e.g. an angle of around 90° to the main direction of the projection 208A) from the end of the projection, generally upwards away from the bottom end (connecting portion 204) of the component 200. A second further portion 512A then extends substantially perpendicularly from the first further portion 510A in a direction substantially parallel that of the main direction of the end of the projection 208A, back towards portion 201A. The length of the first further portion 510A generally corresponds to the thickness of the inner component further projection 508A so that these two portions can interlock as described below.

The second portion 101B of the inner component 100 includes a similar further projection 508B that projects outwardly from a corresponding location below aperture 106B. The second portion 201B of the outer component 200 includes similar first 510B and second 512B further portions that extend outwardly from the projection 208B. It will be appreciated that the further end portions/projections 502-512 shown in FIG. 5 are optional and some or all of them may be present in embodiments of the connecting device, e.g. the further projection and end portion arrangements may be present on one side of the components 100, 200 only, or only the further portions/projections 502-506 may be present. It will also be understood that the further portions/projections shown in FIG. 5 are exemplary only and other arrangements for further securing the interlocking of the components could be utilised, which may or may not allow the two components to be released from each other (as will be described below).

In use, the connecting portion 104 end of the inner component 100 is inserted into the internal space 205 of the outer component 200. The flexible connecting portion 104 allows the portions 101 of the inner component to move towards each other so that the outer surfaces of the first portion can slide over the inner surfaces 202/projections 208 of the outer component 200 when sufficient force is used for the insertion. Also during insertion, the hinge(s) formed by portion 204 can flex to allow the distance between surfaces 201A and 201B to increase, thereby allowing them to deflect for engagement. It may be the case that the portion 104 of the inner component 100 will not deflect to as great an extent as the component 204 of the outer component 200.

The projections may be designed to withstand this use. For instance, in some embodiments, the connecting portion 104 of the inner component 100 may be thinner than other portions of the component 100, or the projections having an appropriate thickness. In general, the thickness of the components will be selected so that the connecting portion and projections can deflect sufficiently for the components to engage. The strength required to maintain the connection under load will also be taken into account. For example, the thickness may be under a millimetre (for a light applications) to around a centimetre (for a connector intended to be used in a building structural member).

When the inner component projections 108 have been moved past the outer component projections 208, the inner component projections 108 can enter (at least partially) into the corresponding apertures 206 on the outer component 200. The outer component projections 208 can also enter (at least partially) into the corresponding apertures 106 on the inner component 100. At this point, the co-operation of the projections and apertures on the two components 100, 200 means that they act as barbs/fixing devices that substantially fix the two components together. It will be appreciated that not all of the apertures 106, 206 and projections 108, 208 may be necessary to provide fixing between the two components 100, 200, e.g. fixing could be achieved by projections 108A, 108B co-operating with apertures 206A, 206B, respectively, only, without projections 208 and apertures 106 (or vice versa).

The tension and compression forces provided by the connecting portion 104 of the inner component 100 causes the outer surfaces 102A, 102B of the inner component to press against the inner surfaces 202A, 202B of the outer component, and complementary forces provided by connection portion 204 of the outer component 200 can also help maintain the connection. In some cases, the force may be such that friction between contacting parts of the surfaces 102, 202 is sufficient to provide some fixing, in which case the surfaces can be considered to be the fixing formations. In an alternative embodiment, the connection portion 104 can be a separate component, e.g. a spring, which may be a tension spring, that is connected to the two portions 101A, 101B. In some cases, a force may be exerted on at least one of the portions 201A, 201B of the outer component to further maintain contact between the surfaces 102, 202 of the two components 100, 200. It will be appreciated that other ways of maintaining contact between the surfaces 102, 202 can be used. For example, pneumatic or electromechanical devices could be used, or an external force on either or both portions 101 of the inner component 100 and/or either or both portions 201 of the outer component 200.

In the embodiment shown in FIG. 5, the further projections 502 extending from the outer surfaces of the outer component 200 can enter (at least partially) into the gap defined between adjacent surfaces of the end of the inner component projections 108 and the corresponding second further projection portions 506, with the ends of the further projections 502 possibly contacting the corresponding first further projection portions 504. Thus, the ends of the further projections 502 can fit into (or be substantially encircled by) the ends of the projections 108. Also, the further projections 508 extending from the inner surfaces 102 of the inner component 100 can enter (at least partially) into the gap defined between adjacent surfaces of the end of the outer component projections 208 and the corresponding second further projection portions 512, with the ends of the further projections 508 possibly contacting the corresponding first further projection portions 510. Thus, the ends of the further projections 508 can fit into (or be substantially encircled by) the ends of the projections 208. This fitting/encircling of the ends of the projections can further secure the fixing of the two components 100, 200 together.

It will be appreciated that the shapes and configurations of the components 100, 200 shown in the Figures is exemplary only and that variations are possible. For example, the first 101A, 201A and second 101B, 201B portions of the two components can be substantially perpendicular to each other, with a spring or the like extending between the inner surfaces of the inner component to keep its outer surfaces at least partially in contact with the inner surfaces of the outer component.

If the connecting device is to/can be removed to allow the objects connected together by it to be released then the projections 108 of the inner component 100 can be disengaged from the apertures 206 of the outer component 200 by moving the portions 101A, 101B of the inner component together. The projections 208 of the outer component 200 can also be disengaged from the apertures 106 of the inner component 100 in this way, as well as any further co-operating fixing formations, if present. The flexible connecting portion 104 between the two portions 101A, 101B allows the two portions to be moved together (and away from the surfaces 202A, 202B of the corresponding portions 201A, 202B of the outer component 200) for this purpose. If the contact between the inner surfaces 102 of the inner component and the outer surfaces 202 of the outer component is being maintained by means other than tension provided by the connecting portion 104, then this is removed/deactivated. When the fixing formations have been disengaged, the inner component 100 can be removed from the outer component 200 using a force sufficient to overcome any resistance provided by contact between the various projections/surfaces of the two components.

The joint provided by the connecting device can transfer loads along the whole of surfaces 102, 202 of the two components 100, 200 in a substantially continuous and uniform manner, thereby providing a high quality connection between two objects. The connection can also be releasable. Further, installing and de-installing the connecting device is fast compared with many conventional techniques. In several embodiments, the components of the device can be produced at low cost and are self-contained in use.

I claim:

1. A connecting device including:
   an inner component and an outer component each having legs that are convergent and form a truncated v-shape such that the inner component is dimensioned to be at least partially received in the outer component, with an outer surface of each legs of the inner component engaging a corresponding inner surfaces of each leg of the outer component, wherein each of the surfaces include interengageable formations, wherein the legs of the inner component connect at an apex of the truncated v-shape to form a joint allowing relative movement between the legs of the inner component toward each other to enable the insertion of the inner component into the outer component and to bias the legs of the inner component outwardly to facilitate engagement of the corresponding formations, wherein each interengageable formation of the outer component comprises an aperture and a projection extending inwardly from an edge of the aperture, and wherein each interengageable formation of the inner component comprises a corresponding hook extending outwardly, having an end surface connection two spaced-apart, opposed side surfaces defining a recess such that the hook of the inner component passes through the aperture in the outer component such that the projection of the outer component fits into the recess such that the hook encircles the projection.

2. A connecting device according to claim 1, wherein the aperture in the outer component is formed by bending a portion of the outer component outwardly, the bent portion forming the projection of the outer component.

3. A connecting device according to claim 1, wherein outer surfaces of the inner component generally oppose each other and are substantially symmetrical about a notional central line running from one end of the inner component to its other end.

4. A connecting device according to claim 1, wherein inner surfaces of the outer component generally oppose each other and are substantially symmetrical about a notional central line running from one end of the outer component to its other end.

5. A connecting device according to claim 1, wherein shapes of the outer surfaces of the inner component at least partially correspond to shapes of the inner surfaces of the outer component.

6. A connecting device according to claim 1, wherein the joint is a spring-like flexible joint formed between the surfaces of the inner component, in use, the joint biasing the surfaces of the inner component towards the surfaces of the outer component.

7. A connecting device according to claim 6, wherein the joint/hinge takes the form of an inverted V shape.

8. A connecting device according to claim 1, wherein the joint may include a spring; a device formed of elastic material; or a pneumatic device or an electro-mechanical device.

9. A connecting device according to claim 1, wherein at least part of at least one of the inner or outer components is formed of a resiliently flexible material so that when a force is applied to the component, the joint is useable to release the formations of the inner and outer components from each other.

10. A connecting device according to claim 1, wherein the projection comprises a barb formed by a portion of a flat surface of the outer component that projects outwardly at an angle to a main direction of the flat surface of the outer component.

11. A connecting device according to claim 10, wherein each interengageable formation of the inner component comprises a portion of a flat surface of the inner component that projects outwardly at an angle to a main direction of a flat surface of the inner component.

12. A connecting device according to claim 10, wherein each interengageable formation of the outer component comprises a portion of the flat surface of the outer component that projects inwardly at an angle to a main direction of the flat surface of the outer component.

13. A connecting device including:

an inner component and an outer component each having legs that are convergent and form a truncated v-shape such that the inner component is dimensioned to be at least partially received in the outer component, an outer surface of each leg of the inner component engaging a corresponding inner surface of each leg of the outer component, wherein each of the surfaces include interengageable formations, wherein the legs of the inner component connect at an apex of the truncated v-shape to form a joint allowing relative movement between the legs of the inner component toward each other to enable the insertion of the inner component into the outer component and to bias the legs of the inner component outwardly to facilitate engagement of the corresponding formations, wherein each interengageable formation of the inner component comprises an aperture and a projection extending outwardly from an edge of the aperture, and wherein each interengageable formation of the outer component comprises a corresponding hook extending inwardly having an end surface connecting two spaced-apart, opposed side surfaces defining a recess such that the hook of the outer component passes through the aperture in the inner component such that the projection of the inner component fits into the recess such that the hook encircles the projection.

14. A connecting device according to claim 13, wherein the aperture in the inner component is formed by bending a portion of the inner component outwardly, the bent portion forming the projection of the inner component.

15. A connecting device according to claim 13, wherein the outer surfaces of the inner component generally oppose each other and are substantially symmetrical about a notional central line running from one end of the inner component to its other end.

16. A connecting device according to claim 13, wherein the inner surfaces of the outer component generally oppose each other and are substantially symmetrical about a notional central line running from one end of the inner component to its other end.

17. A connecting device according to claim 13, wherein shapes of the outer surfaces of the inner component at least partially correspond to shapes of the inner surfaces of the outer component.

18. A connecting device according to claim 13, wherein the joint is a spring-like flexible joint formed between the surfaces of the inner component, in use, the joint biasing the surfaces of the inner component towards the surfaces of the outer component.

19. A connecting device according to claim 13, wherein the joint takes the form of an inverted V-shape.

20. A connecting device according to claim 13, wherein at least part of at least one of the inner or outer components is formed of a resiliently flexible material so that when a force is applied to the component, the joint is useable to release the formations of the inner and outer components from each other.

* * * * *